April 14, 1942.   J. G. JONES ET AL   2,279,467
LEADER BAR ALIGNING CONTROL
Filed Oct. 28, 1939     4 Sheets-Sheet 4

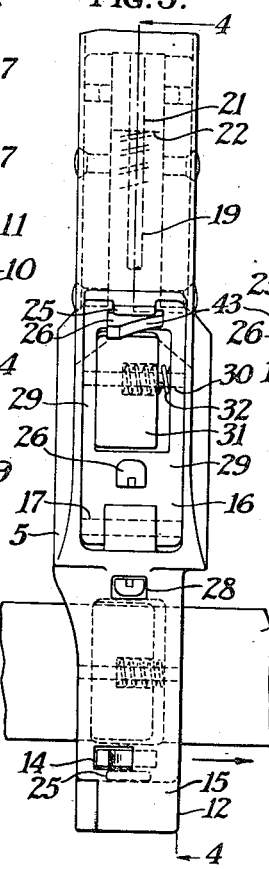

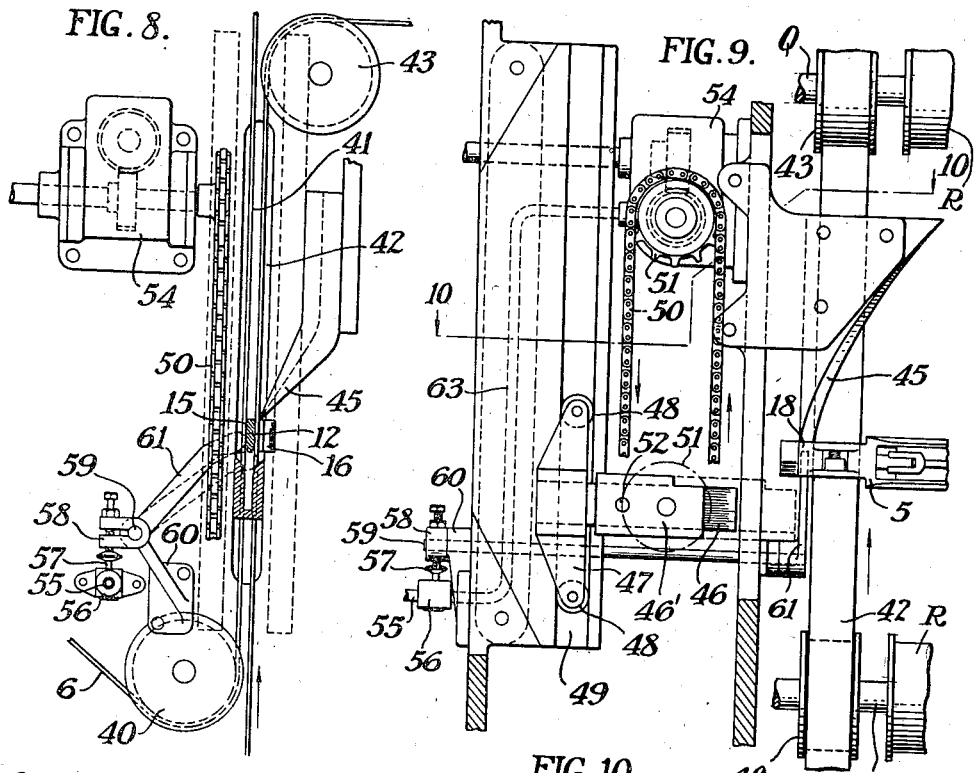

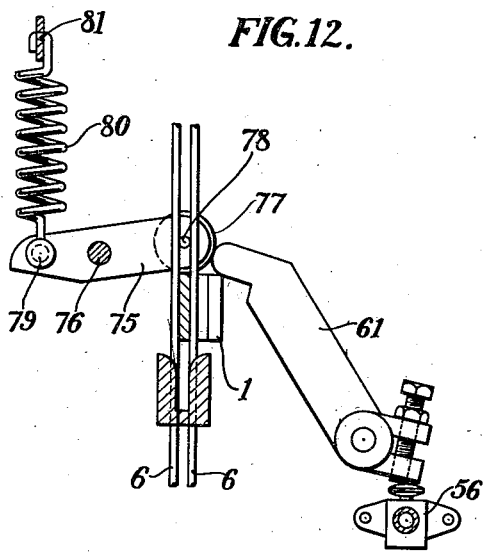
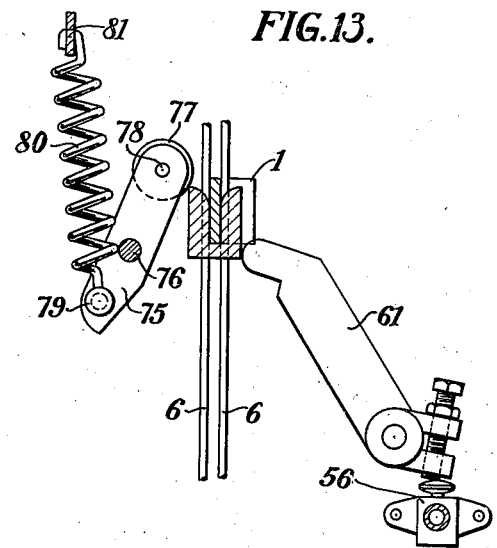
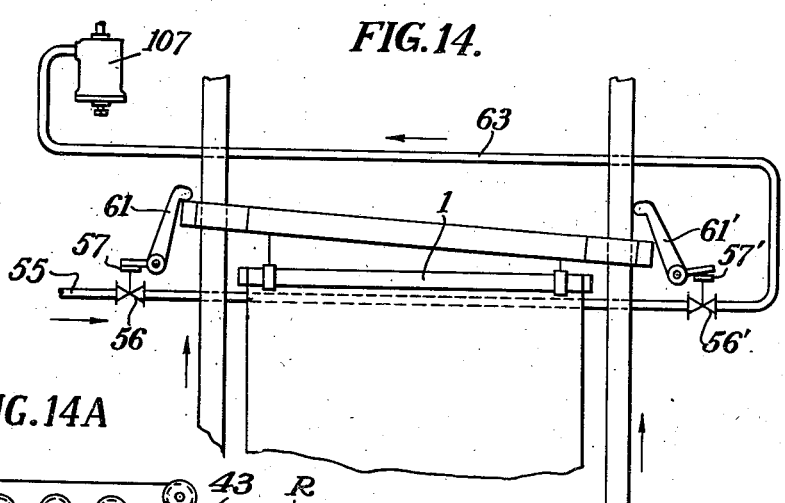
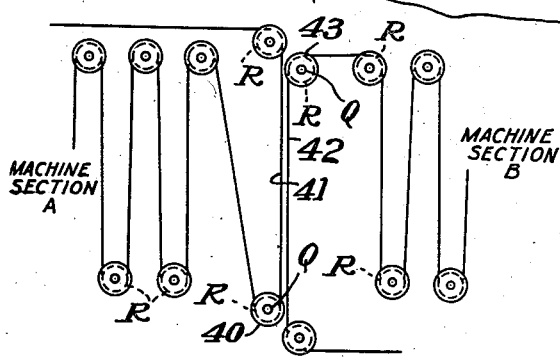

JOHN G. JONES
MALCOLM P. DAVIS
INVENTORS

BY
ATTORNEYS

Patented Apr. 14, 1942

2,279,467

UNITED STATES PATENT OFFICE 2,279,467

LEADER BAR ALIGNING CONTROL

John G. Jones and Malcolm P. Davis, Rochester, N. Y., assignors to Eastman Kodak Company, Rochester, N. Y., a corporation of New Jersey Application October 28, 1939, Serial No. 301,854

16 Claims. (Cl. 271—2.1)

This invention relates to machines employing leader bars propelled by belts through a bath to loop strip material about a plurality of supporting rollers.

One object of our invention is to provide a means for aligning the leader bar, if it should start to grip on one belt relative to the other belt in passing through the machine. Another object of our invention is to provide a device which will insure the proper operation of a double jawed leader bar transferring the grip from one set of jaws to another as the leader bar passes from one set of belts to another. Another object of our invention is to provide a leader bar restraining mechanism which will tend to hold back on one end of the leader bar, if it should be progressing through the machine in advance of the other end of the leader bar. Still another object of our invention is to provide a means for properly positioning the leader bar, so that both ends of the leader bar may be simultaneously raised by an elevating mechanism at a transfer station, and other objects will appear from the following specification, the novel features being particularly pointed out in the claims at the end thereof.

In leading long strips of material through a machine for threading the material about a plurality of loops supported by rollers, belts have been used, passing through approximately the same path as the material, these belts being adapted to convey leader bars resiliently attached to the strip material through the proper path for threading. In machines of considerable length, it has been found expedient to provide a number of different sections where the various treatments to the strip material may take place, and to provide each section with a pair of parallel belts spaced apart and passing through approximately the path that the strip material is to follow. Where two sections of the machine may come together, the belts of one machine are made to lie parallel to and close to a short run of the belts of the other machine. This portion of the machine may be called a change-over station, because as the leader bar passes this section, the jaws of the leader bar, which grasp one set of belts, are made to release the belts and to grasp the belts of the next machine section. During this change-over, it is necessary to provide a supplemental means which will continue to move the leader bar, and we have called this supplemental means an elevator, because it is usually more desirable to have the belts arranged vertically, or nearly vertically at the change-over station.

In the application of John G. Jones and Alfred C. Robertson, Serial No. 272,660, filed May 9, 1939, for Leader bar for threading roller machines with strip material, there is discussed in detail the jaw structure of the leader bar, and this application is for an improvement over the structure shown therein.

Coming now to the drawings, wherein like reference characters denote like parts throughout:

Fig. 1 is a longitudinal section with a portion of a leader bar broken off showing a leader bar and portions of a jaw construction constructed in accordance with and embodying a preferred form of our invention, parts of this figure being shown in elevation.

Fig. 2 is a fragmentary part section and part elevation showing a portion of the leader bar, the section being taken at right angles to the section of Fig. 1 and showing the same leader bar as in Fig. 1.

Fig. 3 is an enlarged fragmentary top plan view showing the jaw structure used at the ends of the leader bar.

Fig. 4 is an enlarged fragmentary section on line 4—4 of Fig. 3, showing the jaw construction partially in elevation and showing a portion of the leader bar in section.

Fig. 5 is an enlarged sectional view across a fixed and movable jaw element showing the relationship of these two jaws and the cam opening into which the jaw separator may project.

Fig. 6 is an enlarged fragmentary section showing the resilient gripper surface of the movably mounted jaw and its relationship to the fixedly mounted jaw and belt.

Fig. 7 is a sectional view taken on line 7—7 of Fig. 2.

Fig. 8 is a fragmentary side elevation showing a portion of the leader bar, in section, of a machine embodying two belt systems and showing a side elevation of the change-over mechanism.

Fig. 9 is an end elevation, partially in section, showing the change-over mechanism for a belt on one side of a machine, it being understood that similar structures are used on both sides— one for each belt.

Fig. 10 is a section on line 10—10 of Fig. 9.

Fig. 11 is a plan view, partially broken away, showing the leader bar with jaws attached to its moving belts, moving an end of strip material for threading a machine.

Fig. 12 is a detail fragmentary section showing a leader bar restraining device and a valve operating lever just as a leader bar reaches the change-over station.

Fig. 13 is a view similar to Fig. 12, but with the leader bar starting to move past the leader restrainer and the valve operating lever.

Fig. 14 is a diagrammatic elevation showing the relationship of the dual air valve control for the elevator mechanism.

Fig. 14A is a diagrammatic view showing parts of the machine sections in elevation.

Figure 15:
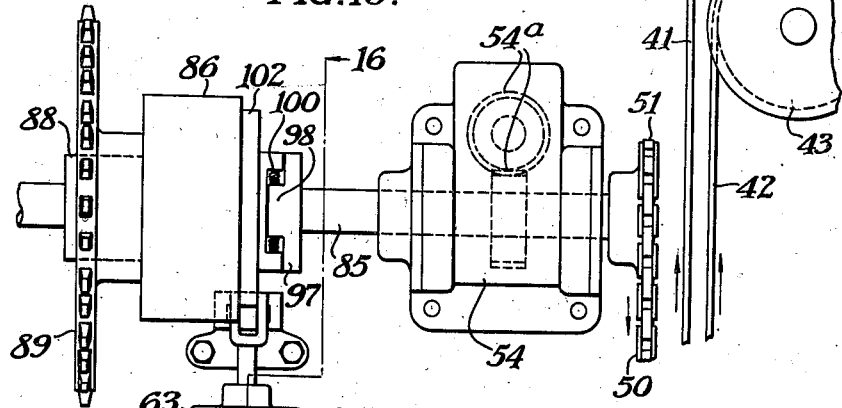
Fig. 15 is a side elevation of a clutch mechanism for operating the leader bar elevator.
Figure 17:
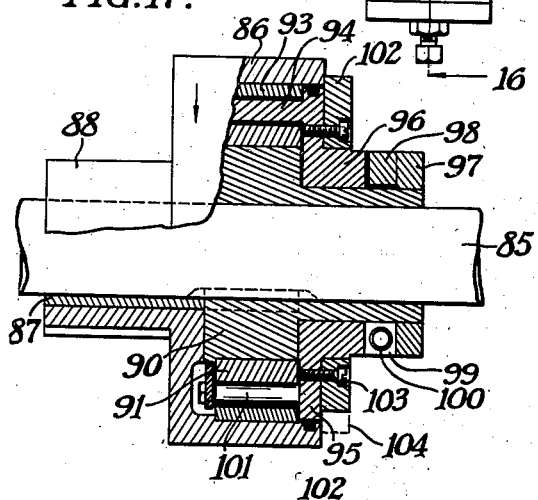
Fig. 17 is a longitudinal partial section of the clutch shown in Fig. 15.

Referring to Fig. 11, the strip material S may have one end E looped about an auxiliary bar 1, and this bar, in turn, may be attached by suitable clips 2 and cables 3 to a leader bar 4 having belt grasping jaws designated broadly as 5 at each end for resiliently grasping a pair of belts 6. Thus, when these belts are moved through any desirable path for guiding the strip material S about a plurality of rollers R (Fig. 14A), the leader bar 4 and the auxiliary bar 1 will draw the strip material S through the path defined by the belts 6, thus threading the strip material around the rollers R and through the several sections A and B of the machine. As many sections as desired may be employed.

The particular type of machine embodying a plurality of rollers R is not important, and since such machines are well known, they will not be more fully described herein.

Referring to Figs. 1 and 2, it will be noted that the strip material S, which is looped about the auxiliary bar 1, may be held on the bar by means of spring clips 2, or it may be wrapped around the bar, which is preferably rectangular in shape as shown in Fig. 7, and an end portion E may be sewed, glued or otherwise fastened to the strip material S so as to hold firmly to the auxiliary bar 1.

Each of the clips 2 is attached to a cable 3, and the object of these cables is to exert an even and resilient pull on the strip material when the leader bar 4 is moved along by means of the jaws 5 and the belts 6. In order to obtain this resilient and even drag upon the auxiliary bar 1, the cables 3 are trained over a series of pulleys 7 mounted entirely within the hollow leader bar 4, so that each of the two cables will be attached to an end 8 of a coil spring 9, the other end of which, 10, is anchored upon a shaft 11, carried by the leader bar. Thus, the spring 9 exerts equal pressure upon both of the cables 3, and any sudden movement of the leader bar 4 will cause the spring 9 to flex and gently transmit the force to the strip material S.

In order to move the leader bar 4 by means of the belts 6, the leader bar is provided at each end with a jaw structure broadly indicated at 5. This jaw structure includes a relatively fixed jaw member 12 which is attached to the end 13 of the leader bar and which is provided with elongated openings 14 and with smooth belt-engaging faces 15 on each side.

Cooperating with this relatively fixed jaw is a pair of movable jaws carried in one piece 16, pivotally mounted at 17 upon the ends 13 of the leader bar 4, which are spaced apart a distance sufficient to permit the jaws 16 to move in between the spaced ends. As indicated in Figs. 3 and 4, the pivoted member 16 carries a pair of movably mounted jaws 18, spaced to each side of the pivot 17 and so arranged that either one jaw or the other will be resiliently held against the fixed jaw member 12, by means of a spring plunger 19. This spring plunger may be pivotally attached at 20 to the jaw carrying member 16, and is preferably mounted to slide in a bearing 21 on the oscillatable block 22, this block likewise supporting one end of a spring 23 which exerts a thrust upon the washer 24 to hold the member 16 in a set position.

As will be obvious from this figure, the spring 23 is effective to hold either of the two jaws 18 in an operative position and will increase its force upon the member 16 as it passes a dead center across pivot 17.

Each of the jaw members 18, which are movably mounted with respect to the jaw 12, carry a spacing lug 25 on the extreme outer ends, this spacing lug being adapted to engage with a smooth face 15 of the relatively fixed jaw member to hold the jaw in a definite relation thereto. Each of the movable jaws is likewise provided with a pair of spaced lugs 26 which may engage in the apertures 14 and 28 of the relatively fixed jaw member so that they will serve as edge guides to hold the belt 6 in its proper position between one movable and the fixed jaw member.

Each of the jaws is so arranged that it will always exert a predetermined and resilient pressure upon the belt member 6. As indicated in Fig. 6, the movable jaw member 18 may include a pair of spaced side walls 29, carrying a shaft 30 arranged diagonally with respect to the fixed jaw 12 and with respect to a belt 6 lying flat upon the fixed jaw. On this shaft there is a belt gripping member in the form of a shoe 31 which is normally thrust along the shaft by a spring 32, and by selecting the proper springs, the exact degree of pressure upon this member can be readily controlled.

With the belt moving in the direction shown by the arrow in Fig. 6, it will be noted that the spring 32 contacts the shoe 31 with a surface of the belt, gripping it between the shoe and the relatively fixed jaw 12. As the belt moves along, if a sudden force should be applied to the belt, the shoe 31 will tend to move against the pressure of the spring 32 so that the belt is permitted to slip. We have found with this construction that the jaws may be permitted to slip all the time, with respect to the belts, and thread strip material satisfactorily, or they may be adjusted to grip the belt resiliently and move at the same speed as that of the belt while threading the strip material. In both cases it is desirable to have the resilient shoe on the movable jaw member to take care of any emergencies which may arise, such as irregularities in the belt surface, splices or the like, or to permit the jaw members to slip in cases where the machine may be threading improperly for some reason. In any event, a force, above a certain amount, applied to the belt in excess to the possible speed of travel of the strip material will always cause the jaw members to slip.

It is understood that while we have just described a single jaw member consisting of the two movable jaws pivotally mounted on one part which may be moved relative to one fixedly mounted jaw with two belt engaging surfaces, each leader bar has two sets of these jaws, one at each end.

The reason for having this double movable jaw construction is that where it is desirable to transfer the leader bar from one section of a machine to another, or from one belt to another, this can readily be done, as indicated in Figs. 8, 9 and 10. In these figures, a belt 6 is shown passing over a pulley 40, this belt having a parallel run indicated at 41 relative to a second belt 42 which is trained over the guide pulley 43 and which may be driven separately from the belt 6. It is preferable, of course, to have these belts driven at exactly the same speed, although this is not essential. However, it is assumed that the leader bar is carried by a pair of spaced and parallel belts 6 and that it is desirable to transfer the leader bar from the belts 6 to the belts 42, this transfer being accomplished rapidly and without permitting any appreciable quantity of slack to occur between the leader bar and the strip material. This can be accomplished in the following manner: From Fig. 5, it will be noticed that there is a wedge-shaped edge 43 on one extreme end of a movable jaw member 18 so that if a sharp member enters between the wall 43 and the flat surface 15 of the relatively fixed jaw member, it may cam the jaw member away from the belt 6 and just as soon as it has cammed the jaw member far enough to cause the pivot 20 to pass a dead center with respect to the pivot 17, the spring member 23 will exert a thrust upon the jaw member 18 which is open and cause it to rapidly swing to an operative position with respect to the other side of the fixed jaw member 12. Thus, the horizontal runs 41 of the belts 6 may be released by one set of movable jaw members just before belts 42 are engaged by the opposite set of jaw members.

As will be seen from Figs. 8 and 9, a cam member 45 is provided on each side of the machine, this cam member being arranged in such a position that it will pass between the cam surface 43 of a movable jaw member 18 and the relatively fixed jaw member. However, it is obvious that just as soon as the leader bar comes to a position in which the jaw members are moved by the cam members 45 out of a belt-gripping position, the leader bar can no longer be moved by the belt and must be moved by some supplemental means.

To accomplish this, we have provided a form of elevator at each change-over which operates in the following manner: The elevating mechanism consists of a member 46' telescopically mounted for longitudinal sliding movement upon bar 46 supported by means of a carriage 47 having rollers 48 freely movable in the grooved rails 49. This carriage may move up and down and the slidable member 46' of the elevating mechanism may be moved in and out along bar 46 by means of the chain 50 passing over a pair of spaced sprockets 51. The chain 50 carries a pin 52 connected with the slidable member 46'. This chain may be driven by a known mechanism 86 which is adjusted to drive the chain members 50 through one cycle of operations, which, in the present instance, is from the position shown in Fig. 9, to the same position, the pin 52 having been driven in one cycle around the lower sprocket 51, upwardly and over the upper sprocket 51 and back to its initial position. This movement will cause the movably mounted slide member 46' to move out under the jaw members 5 and to engage the jaw members and move them upwardly. Thus the leader bar is engaged and moved by the slide members 46' before the jaws release one set of belts 42, and they are still driven at the point where the movable jaw members snap over from one belt-engaging position to a position to engage the other belts. Since the opposite belt is also moving, just as soon as the movable jaw member reaches a belt-engaging position, the belt carries the leader bar forwardly through the machine and the automatic change-over chain has completed its cycle and comes to rest in the position shown in Fig. 9.

In the application of Jones & Robertson above referred to, the elevator mechanism was controlled by a single air valve mechanism. This structure works satisfactorily, but occasionally, if too much slip occurred between the jaws on one end of the leader bar and its conveying belt, so that it lagged behind the opposite end of the leader bar, some difficulty might be experienced due to a tendency of the leader end of the strip material to gradually move to one side or the other of its normal path, thus causing imperfect threading. A second difficulty could arise if the leader bar moved too far out of its proper position, in that when the leader bar reached the change-over station, it might be possible for the elevator to be released by the valve-operating mechanism 61, so that the elevator might start so quickly that only one end of the bar would be moved, the other end lagging behind the slide member 46', operated by the carrying pin 52.

To overcome these possible difficulties, we have provided, in addition to the structure shown in the earlier application, a dual control and leader restraining members which will straighten the leader bar and will tend to hold the advancing end of the leader bar until both ends of the leader are in the exact position for the most effective use of the elevator.

The control mechanism in our present embodiment is a compressed air system in which the air enters a pipe 55, passing through a valve 56 having a spring valve seat 57 which lies in the path of an operating arm 58, pivoted at 59 upon a suitable bracket 60 and having an arm member 61 projecting into the path of the end of the leader bar. Thus, as the leader bar moves upwardly as it is carried along by the belts 6, an end of the leader will engage the lever arm 61, depressing the valve 57, and if the second air valve 55' has simultaneously been operated, air may pass to the clutch operating mechanism shown in Fig. 15. This mechanism includes a clutch of known type in which a detent operated by compressed air permits the clutch to engage a shaft, so that the source of power, such as a motor, may operate the chain 50 through one cycle, which is to and from the position shown in Fig. 9. In other words, one cycle of operation causes the pin 52 to pass around the lower sprocket 51, pass upwardly and over the upper sprocket 51 and down again into the position shown in Fig. 9. This movement causes the slide 46' to move outwardly and under the end of the leader bar, carrying the leader bar upwardly the short distance necessary to cause the cam 45 to switch over the jaw structure from one belt 6 to the adjacent belt 6 at the change-over station.

The mechanism by which the chain 50 is moved through one cycle, as above described, includes the shaft 85 on which the sprocket 51 is mounted, this shaft passing through the box 54 and serving to drive the mechanism on the opposite side of the machine through spiral gears 54a.

On the shaft 85 is also mounted a clutch mechanism, which in the present instance is shown as a commercially known device having a shell 86 freely revoluble on the shaft 85 on a bushing 87. The shell 86 has a hub extension 88, and a sprocket 89 is keyed thereto, said sprocket being suitably driven by connections to a source of power as previously mentioned. Thus, the shell 86 is continuously rotating.

Keyed to the shaft 85 is a hub member 90, and a hardened rim 91 fixed thereon has a plurality of tangential faces 92. The outer shell 86 has a hardened liner 93. Between the faces 92 and the liner 93 are a series of rollers 101 held at equal spacing by fingers 94 that extend inwardly from a flange 95. A sleeve 96, forming part of hub member 90, carries a collar 97 having lugs 98 that extend into recesses 99 in the sleeve. Coil springs 100 tend to retain the collar 97 and the flange 95 in a certain relation, so that the rollers 101 are wedged between the inner face of liner 93 and the adjacent faces 92. When so wedged, the whole constitutes a roller-type of clutch, and the shaft 85 will be turned by and with the sprocket 87, driving the sprocket 51 and thus moving the chain 50 to carry the pin 52 through its orbit to move the elevating bar 46.

A disc 102, bolted at 103 to the flange 95, has a projection 104 that is normally engaged by a dog 105, pivoted to the machine frame at 106. As long as the dog 105 engages the tooth 104, the hub member 90 cannot revolve, and therefore the shaft 85 and the chain 50 remain stationary. If the dog 105 is disengaged from the tooth 104, the springs 100 restore the parts to their initial relation, and the rollers 101 again cause the shell 86 to pick up the hub 90 and shaft 85.

Figure 16:
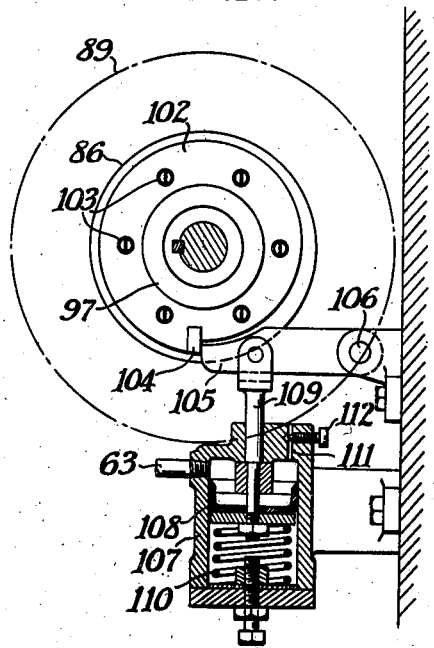
Fig. 16 is a cross section on line 16—16 of Fig. 15.
Figure 18:
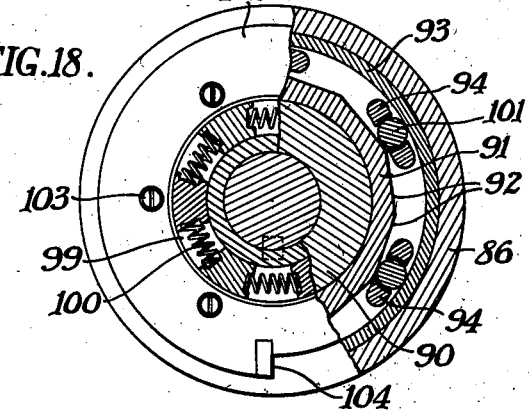
Fig. 18 is an end view, partially broken away, of the clutch mechanism.

In Fig. 16 is shown the means employed for disengaging the dog 105. A cylinder 107, in which is a piston 108 connected with the dog by a plunger 109, receives air from pipe 63 whenever the valves 56 and 56' are operated. The piston is thus depressed against a spring 110, and as soon as the dog 105 is pulled from the tooth 104, the shaft 85 begins to revolve.

If the air, which comes from the valves in a single brief "shot" were held in the cylinder 107, the dog could not return and intercept the tooth 104. If the air were permitted to escape instantly, the clutch and shaft could make only one revolution, whereas in some instances more than one may be required. In the present design, the proportions are indicated as such that sprocket 51 has to make three revolutions in order to carry the pin 52 through its complete cycle. Therefore, the dog must not be allowed to return at once under the influence of spring 110, but must be delayed until the clutch has made three revolutions.

To accomplish this delayed action, the cylinder 107 has a small exhaust port 111, and a needle valve 112 is adjustable to completely close this port, if required. The valve in the present instance requires such adjustment that so much of the air will leak out after two revolutions of the shaft 85 that the dog 105 will be raised into the path of tooth 104 between the second and third revolutions after the air is admitted by valves 56 and 56', so that the shaft cannot make more than three revolutions.

In our present embodiment, it will be noted from Fig. 14 that two air valves 56 and 56' are provided, one on each side of the machine, and the operation of the spring plunger 57 is only effective when the spring plunger 57' of the opposite air valve has been operated.

From Figs. 12 and 13, it will be noted that adjacent the arms 61 and 61' for operating the valves 56 and 56', there are a pair of leader bar restraining mechanisms which, in the present instance, consist of a pair of similar devices which are identical on each side of the machine and which will, therefore, only have one set of reference characters.

The leader restrainer may comprise an arm 75, pivoted at 76 to the frame of the machine, and carrying a roller 77, pivoted at 78 to the arm. A stud 79 on one end of the arm 75 is attached to a spring 80, the other end of which is attached to a bar 81 forming a part of the machine. The strength of the spring 80 is such that when the roller 77 contacts with the leader bar 1, it will restrain the movement of the leader bar since the spring 80 is of sufficient strength to overcome the pressure caused by the spring 32 on the belt gripping shoe 31. Consequently, as the leader bar moves upwardly, whichever end of the leader bar may be in advance of the opposite end, will strike the restraining roller 77 and as the lever 75 is swung upon its pivot 76, the increasing resistance of the lever due to the spring 80 will slow up and, if necessary, temporarily halt the movement of the leader bar 4 as the jaws slip upon the belt 6. During this movement, the opposite end of the leader bar, which is attached to the opposite belt, will continue to move until the bar is in position to substantially simultaneously operate both valves 56 and 56', thus permitting air to pass through the pipe 63 to the pneumatic cylinder 107.

Just as soon as both control valves 56 and 56' are operated by the bell crank levers 61 and 61', the pneumatic control 107 immediately releases the elevating mechanism so that the slides 56 will carry the leader bar 4 upwardly through the transfer station, causing the jaws to transfer and grip from one set of belts to another.

It should be noted that the resilient connection between the leader bar 4 and the supplementary leader bar 1 is such that a sudden movement of the bar 4 will not immediately be transmitted to the bar 1, but the spring 9, through the cables 3, will resiliently transmit this motion to the end of the strip material S. In the operation of this machine, it rarely occurs that the leader bar 1 gets out of alignment, and in Fig. 14, we have greatly exaggerated the angle of the leader bar to better illustrate the operation of our two-valve construction. In the greatest majority of cases, the leader bar will pass through the machine at substantially right angles to the belts, but there are occasions where the strip material being led through the machine is either more resilient on one side than the other, or it may stretch along one edge, or the jaws of one side may slip slightly more than the jaws of the leader bar on the other side, so that the leader bar actually does occasionally get out of alignment. It is particularly for these occasions that the leader bar restraining device and the dual valve construction has been found particularly useful. However, we find it is also useful to momentarily hold back the end of the leader bar which is advancing, thereby allowing the jaw of the end being held back to slip until the other end of the bar catches up with it, after which both ends of the bar will be carried past the restraining members by the elevator.

While we have described a preferred embodiment of our invention, it is obvious that various modifications can be readily devised which will

What we claim is:

1. In a machine for handling strip material, the combination with a plurality of sections, of a plurality of rollers in each section over which the strip material is looped, a pair of spaced belts for each section adjacent the path of strip material passing over said rollers, the belts of one section lying adjacent to the belts of another section through a small part of their path constituting a change-over station, a leader bar having double jaws at each end for threading the strip material about said rollers, means for operating the jaws, releasing one belt and grasping the other belt at parallel runs of the belts between sections, a power driven auxiliary conveyor normally at rest and positioned adjacent the path of the leader bar, means for operating the auxiliary power driven conveyor including two control members both lying in the path of the leader bar to be operated thereby, said power driven conveyor being movable only when both ends of the bar are properly positioned to be engaged by the auxiliary conveyor, in which position both control members may be operated by the leader bar for releasing the power drive of the auxiliary conveyor for moving the leader bar between the two adjacent runs of the belts at the change-over station.

2. In a machine for handling strip material, the combination with a plurality of sections, of a plurality of rollers in each section over which the strip material is looped, a pair of spaced belts for each section adjacent the path of strip material passing over said rollers, the belts of one section lying adjacent to the belts of another section through a small part of their path constituting a change-over station, a leader bar having double jaws at each end for threading the strip material about said rollers, means for operating the jaws, releasing one belt and grasping the other belt at parallel runs of the belts between sections, a power driven auxiliary conveyer normally at rest and positioned adjacent the path of the leader bar, movable control members positioned adjacent the belts on both sides of the machine and in the path of the leader bar for operation thereby, and means operated by the control members for releasing the auxiliary conveyer.

3. In a machine for handling strip material, the combination with a plurality of sections, of a plurality of rollers in each section over which the strip material is looped, a pair of spaced belts for each section adjacent the path of strip material passing over said rollers, the belts of one section lying adjacent to the belts of another section through a small part of their path constituting a change-over station, a leader bar having double jaws at each end for threading the strip material about said rollers, means for operating the jaws releasing one belt and grasping the other belt at parallel runs of the belts between sections, a power driven auxiliary conveyor normally at rest for the leader bar for conveying it as the jaws are changed from one belt to another at the changeover station, and two pivoted levers including arms projecting into the path of the leader being carried by pairs of belts, one adjacent each of the pair of belts, mechanism for the power drive of the supplementary conveyor releasable only when the two pivoted levers are simultaneously engaged by the ends of the leader bar whereby said conveyor may move said bar past the change-over station.

4. In a machine for handling strip material, the combination with a plurality of sections, of a plurality of rollers in each section over which the strip material is looped, a pair of spaced belts for each section adjacent the path of strip material passing over said rollers, the belts of one section lying adjacent to the belts of another section through a small part of their path constituting a change-over station, a leader bar having double jaws at each end for threading the strip material about said rollers, means for operating the jaws releasing one belt and grasping the other belt at parallel runs of the belts between sections, a power driven auxiliary conveyor normally at rest for the leader bar for conveying it as the jaws are changed from one belt to another at the change-over station, and two pivoted levers including arms projecting into the path of the leader bar being carried by pairs of belts, one adjacent each of the pairs of belts, pneumatically operated mechanism for releasing the supplementary conveyor, said pneumatically operated mechanism being under the control of said pivoted levers.

5. In a machine for handling strip material, the combination with a plurality of sections each having pairs of conveyor belts, of a change-over station between sections and including short parallel runs of the belts of one section adjacent a short parallel run of the belts of the other section, a leader bar, means for moving the leader bar from the belts, means for disconnecting the leader bar from the belts, a supplementary conveyor separate from the belts for moving the leader bar between the two sets of belts at the change-over station and means for controlling the position of the leader bar adjacent the supplementary conveyor therefor.

6. In a machine for handling strip material, the combination with a plurality of sections each having pairs of conveyor belts, of a change-over station between sections and including short parallel runs of the belts of one section adjacent a short parallel run of the belts of the other section, a leader bar, means for moving the leader bar from the belts, means for disconnecting the leader bar from the belts, a supplementary conveyor separate from the belts for moving the leader bar between the two sets of belts at the change-over station and means for controlling the position of the leader bar adjacent the supplementary conveyor therefor comprising resilient members lying in the path of and adapted to engage the leader bar as it approaches the change-over station.

7. In a machine for handling strip material, the combination with a plurality of sections each having pairs of conveyor belts, of a change-over station between sections and including short parallel runs of the belts of one section adjacent a short parallel run of the belts of the other section, a leader bar, means for moving the leader bar from the belts, means for disconnecting the leader bar from the belts, a supplementary conveyor separate from the belts for moving the leader bar between the two sets of belts at the change-over station and means for controlling the position of the leader bar adjacent the supplementary conveyor therefor comprising movable equalizing levers mounted adjacent the parallel runs of the belts at the change-over station, springs tending to move the levers into the path of the ends of the leader bar, whereby an end of the leader may engage and retard the movement of an end of the leader bar.

8. In a machine for handling strip material, the combination with a plurality of sections each having pairs of conveyor belts, of a change-over station between sections and including short parallel runs of the belts of one section adjacent short parallel runs of the belts of the other section, a leader bar, means for moving the leader bar from the belts, means for disconnecting the leader bar from the belts, a supplementary conveyor separate from the belts for moving the leader bar between the two sets of belts at the change-over station and means for controlling the position of the leader bar adjacent the supplementary conveyor therefor comprising movable equalizing levers mounted adjacent the parallel runs of the belts at the change-over station, springs tending to move the levers into the path of the ends of the leader bar, whereby an end of the leader may engage and retard the movement of an end of the leader bar until the opposite end thereof engages the opposite movable equalizing lever.

9. In a machine for handling strip material, the combination with a plurality of sections each having pairs of conveyor belts, of a change-over station between sections and including short parallel runs of the belts of one section adjacent short parallel runs of the belts of the other section, a leader bar, means for moving the leader bar from the belts, means for disconnecting the leader bar from the belts, a supplementary conveyor separate from the belts for moving the leader bar between the two sets of belts at the change-over station and means for controlling the position of the leader bar adjacent the supplementary conveyor therefor, a power drive for the supplementary leader conveyor, a pair of control members located adjacent the path of said conveyor and in series for releasing the power drive when both control members are operated, said leader bar engaging and releasing both controls when properly positioned by the means for controlling the position of the leader bar at the change-over station.

10. In a machine for handling strip material, the combination with a plurality of sections each having pairs of conveyor belts, of a change-over station between sections and including short parallel runs of the belts of one section adjacent short parallel runs of the belts of the other section, a leader bar, means for moving the leader bar from the belts including spring jaws frictionally grasping the belts, a leader bar restrainer including movably mounted members spring-pressed into the path of the leader bar near the jaws thereof and adapted to engage said leader bar near the jaw thereof as it is moved through its path and to cause said leader bar to slip on said belt.

11. In a machine for handling strip material, the combination with a plurality of sections each having pairs of conveyor belts, of a change-over station between sections and including short parallel runs of the belts of one section adjacent short parallel runs of the belts of the other section, a leader bar, means for moving the leader bar from the belts including spring jaws frictionally grasping the belts, a leader bar restrainer including movably mounted members spring-pressed into the path of the leader bar near the jaws thereof and adapted to engage said leader bar near the jaw thereof as it is moved through its path and to cause said leader bar to slip on said belt and a supplementary leader bar moving device adapted to engage said slipping leader bar and move it against the spring pressure of the leader bar restrainer.

12. In a machine for handling strip material, the combination with a plurality of sections each having pairs of conveyor belts, of a change-over station between sections and including short parallel runs of the belts of one section adjacent short parallel runs of the belts of the other section, a leader bar, means for moving the leader bar from the belts including spring jaws frictionally grasping the belts, a leader bar restrainer including movably mounted members spring-pressed into the path of the leader bar near the jaws thereof and adapted to engage said leader bar near the jaw thereof as it is moved through its path and to cause said leader bar to slip on said belt and a supplementary leader bar moving device adapted to engage said slipping leader bar and move it against the spring pressure of the leader bar restrainer, the extent of movement of the supplementary leader bar moving device carrying said leader bar past the restraining members moving said members against the pressure of their springs out of the paths of the leader bar.

13. In a machine for handling strip material, the combination with a plurality of sections each having pairs of conveyor belts, of a change-over station between sections and including short parallel runs of the belts of one section adjacent short parallel runs of the belts of the other section, a leader bar, means for moving the leader bar from the belts including spring jaws frictionally grasping the belts, a leader bar restrainer including movably mounted members spring-pressed into the path of the leader bar near the jaws thereof and adapted to engage said leader bar near the jaw thereof as it is moved through its path and to cause said leader bar to slip on said belt, a source of power, a supplementary leader bar moving device operated by said source of power, a control for the source of power, and dual means simultaneously operated by the ends of the leader bar for releasing the source of power for moving the leader bar by the supplementary leader bar moving device.

14. In a machine for handling strip material, the combination with a plurality of sections each having pairs of conveyor belts, of a change-over station between sections and including short parallel runs of the belts of one section adjacent short parallel runs of the belts of the other section, a leader bar, means for moving the leader bar from the belts, means for restraining the leader bar comprising resiliently mounted arms adapted to engage the ends of the leader bar and hold the leader bar against movement, a power driven elevator, and a release for said elevator operable by the ends of the leader bar operable only when the ends of the leader bar are in a predetermined position, whereby said elevator may move said leader bar past said restraining members.

15. In a machine for moving a long strip of material about a plurality of rollers and comprising more than one section, the combination with spaced belts defining approximately the path of strip material passing about the rollers, separate belts for each section, the belts of one section having a short parallel run adjacent a portion of belts of another section constituting a change-over station, a leader bar for conducting material being threaded around the rollers through the proper path, belt-engaging jaws on each end of the leader, means included in the jaws for grasping the belts with a predetermined pressure, and leader bar restrainers positioned adjacent the belts and lying in the path of the leader bar ends, said restrainers being positioned in alignment at right angles to the belts near the change-over station, each restrainer being pressed by a spring into engagement with the advancing leader bar with sufficient force to overcome the predetermined grasp of the leader bar jaws upon the belt, whereby said leader bar jaws may slip relative to the belts.

16. In a machine for moving a long strip of material about a plurality of rollers and comprising more than one section, the combination with spaced belts defining approximately the path of strip material passing about the rollers, separate belts for each section, the belts of one section having a short parallel run adjacent a portion of belts of another section constituting a change-over station, a leader bar for conducting material being threaded around the rollers through the proper path, belt engaging jaws on each end of the leader, means included in the jaws for grasping the belts with a predetermined pressure, and leader bar restrainers positioned adjacent the belts and lying in the path of the leader bar ends, said restrainers being positioned in alignment at right angles to the belts near the change-over station, each restrainer being pressed by a spring into engagement with the advancing leader bar with sufficient force to overcome the predetermined grasp of the leader bar jaws upon the belt, whereby said leader bar jaws may slip relative to the belts, a supplementary moving device for the leader bar, a motor drive therefor, a control for the motor drive adapted to operate the drive through a fixed cycle, dual members which, when simultaneously operated, release the motor drive to operate through the fixed cycle, said dual members being located adjacent and parallel to the restrainers, whereby said leader bar may contact with both of the dual members only when positioned at substantially right angles to the belts at which time said bar may be moved by the supplementary moving device for the motor drive.

JOHN G. JONES.
MALCOLM P. DAVIS.